United States Patent
Kusafuka

(10) Patent No.: US 11,496,725 B2
(45) Date of Patent: Nov. 8, 2022

(54) IMAGE DISPLAY DEVICE, IMAGE DISPLAY SYSTEM, AND MOVABLE BODY

(71) Applicant: KYOCERA Corporation, Kyoto (JP)

(72) Inventor: Kaoru Kusafuka, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/284,214

(22) PCT Filed: Oct. 23, 2019

(86) PCT No.: PCT/JP2019/041537
§ 371 (c)(1),
(2) Date: Apr. 9, 2021

(87) PCT Pub. No.: WO2020/090584
PCT Pub. Date: May 7, 2020

(65) Prior Publication Data
US 2021/0344893 A1 Nov. 4, 2021

(30) Foreign Application Priority Data
Oct. 31, 2018 (JP) ............................. JP2018-205972

(51) Int. Cl.
*H04N 13/31* (2018.01)
*H04N 13/383* (2018.01)
(Continued)

(52) U.S. Cl.
CPC ......... *H04N 13/31* (2018.05); *G02B 27/0093* (2013.01); *G02B 27/0101* (2013.01);
(Continued)

(58) Field of Classification Search
CPC ............... G02B 30/31; G02B 27/0093; G02B 27/0101; H04N 13/383; H04N 13/315; H04N 13/31; G09G 3/003; G09G 5/10
See application file for complete search history.

(56) References Cited

U.S. PATENT DOCUMENTS

2007/0091058 A1   4/2007   Nam et al.
2013/0293793 A1   11/2013   Lu
(Continued)

FOREIGN PATENT DOCUMENTS

CN    1953563 A      4/2007
CN    103383493 A    11/2013
(Continued)

OTHER PUBLICATIONS

Ayuki Hayashishita, Hideki Kakeya, "Time-Division Multiplexing Parallax Barrier with Sub-Subpixel Phase Shift", SID 2018 DIGEST ,p. 88, 1515-1518.

*Primary Examiner* — Neil R Mikeska
(74) *Attorney, Agent, or Firm* — Studebaker & Brackett PC

(57) ABSTRACT

An image display device includes a display panel, a barrier panel, a light projecting unit, and a controller. The display panel is configured so as to include a first display region. The barrier panel is configured so as to include a first barrier region. The light projecting unit is configured so as to include a first light emitting region. The controller is configured so that a portion located in the first display region is displayed as one parallax image frame including two subframes, and configured so that a light quantity of light emitted from the first light emitting region is reduced during a frame change period including a timing of changing display from the parallax image frame to a new parallax image frame.

14 Claims, 8 Drawing Sheets

(51) Int. Cl.
*G02B 27/00* (2006.01)
*G02B 27/01* (2006.01)
(52) U.S. Cl.
CPC ..... *H04N 13/383* (2018.05); *B60K 2370/149* (2019.05); *B60K 2370/1529* (2019.05); *G02B 2027/0134* (2013.01)

(56) References Cited

U.S. PATENT DOCUMENTS

| | | | | |
|---|---|---|---|---|
| 2015/0237339 | A1* | 8/2015 | Ho | G09G 3/003 348/46 |
| 2015/0319427 | A1* | 11/2015 | Wu | H04N 13/315 345/426 |
| 2016/0007010 | A1* | 1/2016 | Yamakawa | G02B 6/0078 348/53 |
| 2016/0323568 | A1* | 11/2016 | Guido | H04N 13/324 |
| 2017/0026637 | A1* | 1/2017 | Lu | G02B 30/27 |
| 2019/0377177 | A1 | 12/2019 | Takahashi et al. | |

FOREIGN PATENT DOCUMENTS

| | | |
|---|---|---|
| EP | 1777575 A2 | 4/2007 |
| EP | 2663081 A2 | 11/2013 |
| JP | 2007-072217 A | 3/2007 |
| JP | 2007-114793 A | 5/2007 |
| JP | 2014-068331 A | 4/2014 |
| WO | 2018139611 A1 | 8/2018 |

\* cited by examiner

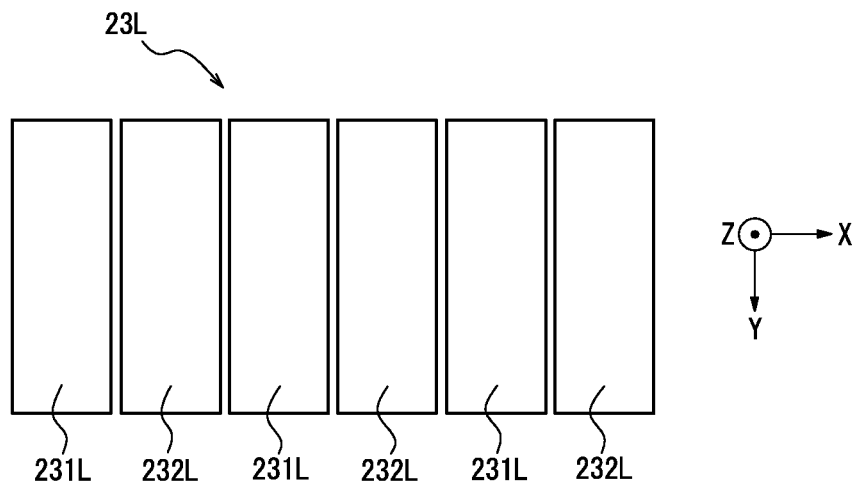
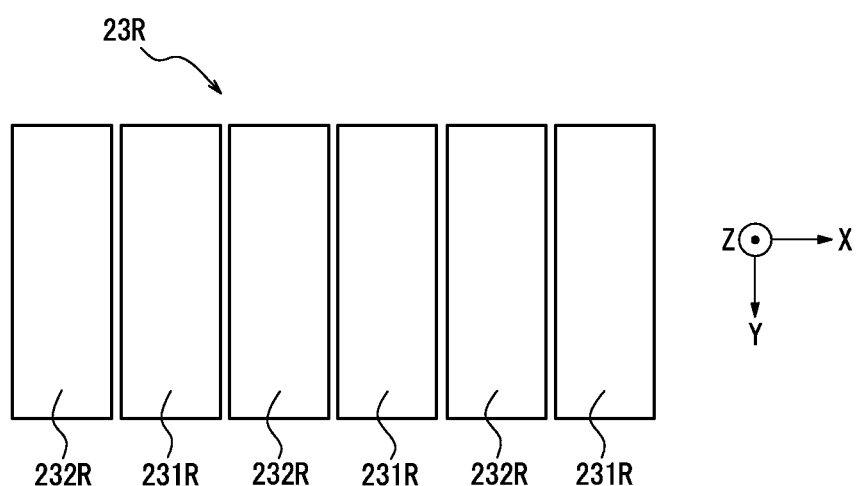

IMAGE DISPLAY DEVICE, IMAGE DISPLAY SYSTEM, AND MOVABLE BODY

CROSS-REFERENCE TO RELATED APPLICATION

This application claims priority to Japanese Patent Application No. 2018-205972 (filed on Oct. 31, 2018), the contents of which are incorporated herein by reference in its entirety.

TECHNICAL FIELD

The present disclosure relates to an image display device, an image display system, and a movable body.

BACKGROUND

In a related art, there is known an image display device which projects a parallax image to both eyes of a user by an active barrier to provide stereoscopic vision. The number of effective pixels of the parallax image projected on the left and right eyes of the user is less than half the number of effective pixels of a display panel. Here, there is known a configuration which increases the number of effective pixels of the parallax image by driving the active barrier so that images projected on the left and right eyes of the user are exchanged between even-numbered frames and odd-numbered frames displayed in one set. This technique is described, for example, in the following paper: Ayuki Hayashishita, Hideki Kakeya, "Time-Division Multiplexing Parallax Barrier with Sub-Subpixel Phase Shift", SID 2018 DIGEST, P-88, 1515-1518.

SUMMARY

An image display device according to an embodiment of the disclosure includes a light projecting unit, a display panel, a barrier panel, and a controller. The light projecting unit includes a plurality of light emitting elements. The display panel is located so as to receive light from the light projecting unit and is configured so as to display a plurality of frames. The barrier panel is configured so as to overlap the display panel and include a plurality of light transmitting portions and a plurality of dimming portions. A traveling direction of at least part of image light emitted from the display panel is divided for a right eye and a left eye of a user, by the plurality of light transmitting portions and the plurality of dimming portions. The controller is configured so as to control the light projecting unit, the display panel, and the barrier panel. The display panel is configured so as to include a first display region and a second display region. The display panel is configured so as to display a right-eye image which is viewed by the right eye of the user, in a right-eye visible region of the first display region. The display panel is configured so as to display a left-eye image which is viewed by the left eye of the user, in a left-eye visible region of the first display region. The barrier panel is configured so as to include a first barrier region corresponding to the first display region. The barrier panel is configured so that the plurality of light transmitting portions and the plurality of dimming portions are formed in the first barrier region so that the right-eye visible region and the left-eye visible region are at different positions of the first display region. The light projecting unit is configured so as to include a first light emitting region corresponding to the first display region. The controller is configured so that, in a case where two consecutive frames are displayed, a portion located in the first display region is displayed as one parallax image frame including a first subframe and a second subframe. The controller is configured so as to control the display panel and the barrier panel so that an image displayed in each of the first subframe and the second subframe included in the one parallax image frame is combined and viewed as one parallax image by the user. The controller is configured so as to control, for each parallax image frame, display of the parallax image in the first display region and formation of the light transmitting portions and the dimming portions in the first barrier region. The controller is configured so that a light quantity of light emitted from the first light emitting region is reduced during a frame change period which includes a timing of changing display from the parallax image frame to a new parallax image frame.

An image display system according to another embodiment of the disclosure includes an image display device and a reflective member. The image display device includes a light projecting unit, a display panel, a barrier panel, and a controller. The light projecting unit includes a plurality of light emitting elements. The display panel is located so as to receive light from the light projecting unit and is configured so as to display a plurality of frames. The barrier panel is configured so as to overlap the display panel and include a plurality of light transmitting portions and a plurality of dimming portions. A traveling direction of at least part of image light emitted from the display panel is divided for a right eye and a left eye of a user, by the plurality of light transmitting portions and the plurality of dimming portions. The controller is configured so as to control the light projecting unit, the display panel, and the barrier panel. The display panel is configured so as to include a first display region and a second display region. The display panel is configured so as to display a right-eye image which is viewed by the right eye of the user, in a right-eye visible region of the first display region. The display panel is configured so as to display a left-eye image which is viewed by the left eye of the user, in a left-eye visible region of the first display region. The barrier panel is configured so as to include a first barrier region corresponding to the first display region. The barrier panel is configured so that the plurality of light transmitting portions and the plurality of dimming portions are formed in the first barrier region so that the right-eye visible region and the left-eye visible region are at different positions of the first display region. The light projecting unit is configured so as to include a first light emitting region corresponding to the first display region. The controller is configured so that, in a case where two consecutive frames are displayed, a portion located in the first display region is displayed as one parallax image frame including a first subframe and a second subframe. The controller is configured so as to control the display panel and the barrier panel so that an image displayed in each of the first subframe and the second subframe included in the one parallax image frame is combined and viewed as one parallax image by the user. The controller is configured so as to control, for each parallax image frame, display of the parallax image in the first display region and formation of the light transmitting portions and the dimming portions in the first barrier region. The controller is configured so that a light quantity of light emitted from the first light emitting region is reduced during a frame change period which includes a timing of changing display from the parallax image frame to a new parallax image frame. The reflective member reflects the image light and causes the image light to reach the left eye and the right eye of the user.

A movable body according to still another embodiment of the disclosure is equipped with an image display system. The image display system includes an image display device and a reflective member. The image display device includes a light projecting unit, a display panel, a barrier panel, and a controller. The light projecting unit includes a plurality of light emitting elements. The display panel is located so as to receive light from the light projecting unit and is configured so as to display a plurality of frames. The barrier panel is configured so as to overlap the display panel and include a plurality of light transmitting portions and a plurality of dimming portions. A traveling direction of at least part of image light emitted from the display panel is divided for a right eye user and a left eye of a user, by the plurality of light transmitting portions and the plurality of dimming portions. The controller is configured so as to control the light projecting unit, the display panel, and the barrier panel. The display panel is configured so as to include a first display region and a second display region. The display panel is configured so as to display a right-eye image which is viewed by the right eye of the user, in a right-eye visible region of the first display region. The display panel is configured so as to display a left-eye image which is viewed by the left eye of the user, in a left-eye visible region of the first display region. The barrier panel is configured so as to include a first barrier region corresponding to the first display region. The barrier panel is configured so that the light transmitting portions and the dimming portions are formed in the first barrier region so that the right-eye visible region and the left-eye visible region are at different positions of the first display region. The light projecting unit is configured so as to include a first light emitting region corresponding to the first display region. The controller is configured so that, in a case where two consecutive frames are displayed, a portion located in the first display region is displayed as one parallax image frame including a first subframe and a second subframe. The controller is configured so as to control the display panel and the barrier panel so that an image displayed in each of the first subframe and the second subframe included in the one parallax image frame is combined and viewed as one parallax image by the user. The controller is configured so as to control, for each parallax image frame, display of the parallax image in the first display region and formation of the light transmitting portions and the dimming portions in the first barrier region. The controller is configured so that a light quantity of light emitted from the first light emitting region is reduced during a frame change period including a timing of changing display from the parallax image frame to a new parallax image frame. The reflective member reflects the image light and causes the image light to reach the left eye and the right eye of the user.

BRIEF DESCRIPTION OF DRAWINGS

FIG. 8 is a diagram illustrating an example of a sub-left-eye image included in a left-eye image;
FIG. 9 is a diagram illustrating an example of a sub-right-eye image included in a right-eye image.

DETAILED DESCRIPTION

Figure 1:
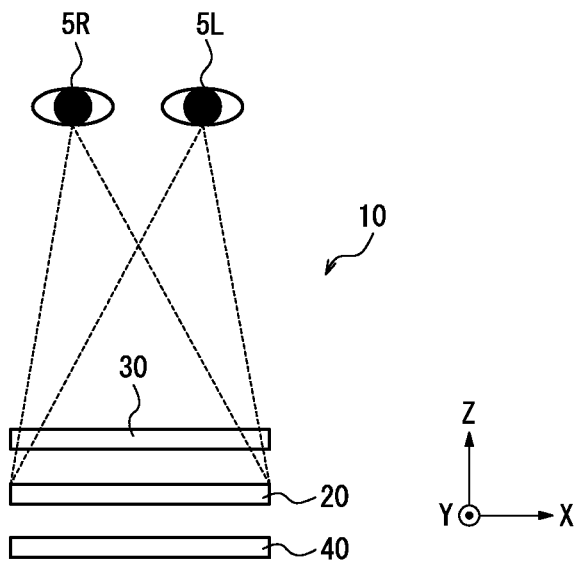
FIG. 1 is a side view illustrating a configuration example of an image display device according to an embodiment.
Figure 2:
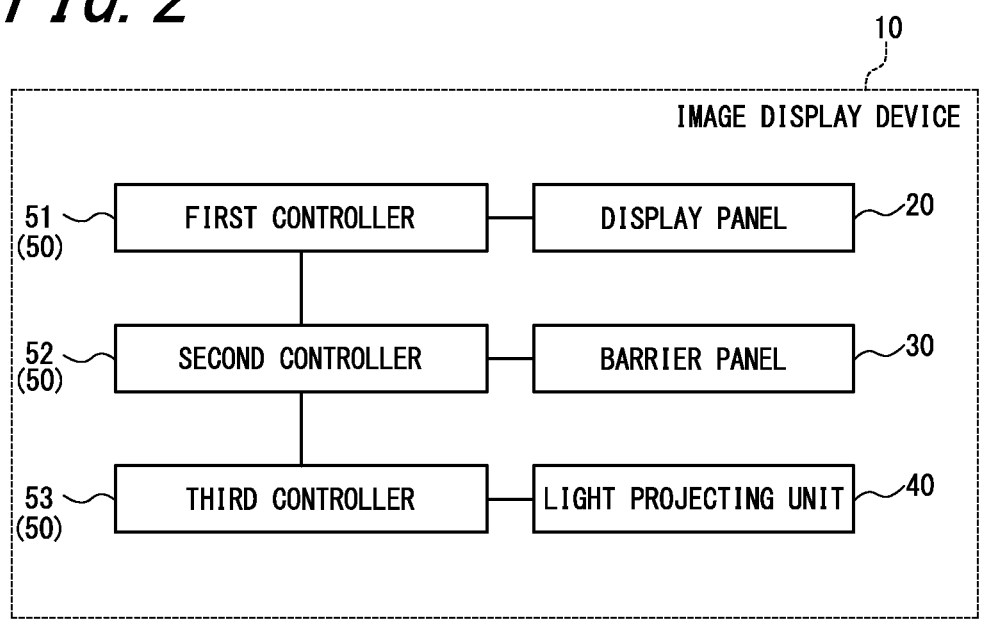
FIG. 2 is a block diagram illustrating a configuration example of the image display device according to the embodiment.

As illustrated in FIGS. 1 and 2, an image display device 10 according to an embodiment includes a display panel 20, a barrier panel 30, a light projecting unit 40, and a controller 50.

The light projecting unit 40 is configured so as to emit light toward a right eye 5R and a left eye 5L of a user via the display panel 20 and the barrier panel 30. The light projecting unit 40 is located on a side farther from the user than the display panel 20 and the barrier panel 30 when viewed from the user. The barrier panel 30 may be located closer to or farther from the user than the display panel 20 when viewed from the user. That is, the light emitted from the light projecting unit 40 may enter the display panel 20 first, or may enter the barrier panel 30 first.

The display panel 20 includes a plurality of pixels. The display panel 20 is configured so as to control the transmittance of light incident from the light projecting unit 40 in each pixel and emit the light as image light reaching the user's eyes. The user views an image composed of image light emitted from each pixel of the display panel 20.

The barrier panel 30 is configured so as to limit a traveling direction of the incident light. In the case where the light emitted from the light projecting unit 40 first enter the display panel 20, the barrier panel 30 is configured so as to dim part of the image light emitted from the display panel 20 and transmit the other part of the light toward the user's right eye 5R and left eye 5L. In the case where the light emitted from the light projecting unit 40 first enter the barrier panel 30, the barrier panel 30 is configured so as to dim part of the light emitted from the light projecting unit 40 and transmit the other part of the light toward the display panel 20. The display panel 20 is configured so as to emit incident light traveling in a direction limited by the barrier panel 30 as image light so as to travel as it is.

The barrier panel 30 is configured so as to be able to control the traveling direction of the image light regardless of whether the display panel 20 or the barrier panel 30 is located closer to the user. The barrier panel 30 is configured so as to allow part of the image light emitted from the display panel 20 to reach one of the user's left eye 5L and right eye 5R and allow the other part of the image light to reach the other eye of the user. That is, the barrier panel 30 is configured so as to divide the traveling direction of at least part of the image light for the left eye 5L and the right eye 5R of the user.

The image light traveling in the direction limited by the barrier panel 30 can reach the user's left eye 5L and right eye 5R as different image light. As a result, the user can view different images for the left eye 5L and the right eye 5R. That is, the image display device 10 is configured so as to be able to project a parallax image to both eyes of the user. The parallax image is an image projected on each of the user's left eye 5L and right eye 5R and is an image which gives parallax to both eyes of the user. The user can see the image stereoscopically by viewing the parallax image with the left eye 5L and the right eye 5R. The direction which gives parallax to both eyes of the user is also called a parallax direction. The parallax direction corresponds to a direction in which the user's left eye 5L and right eye 5R are lined up.

The controller 50 is connected to each component of the image display device 10 and is configured so as to control each component. The controller 50 may include a first controller 51, a second controller 52, and a third controller 53. The first controller 51 may be configured so as to control the display panel 20. The second controller 52 may be configured so as to control the barrier panel 30. The third controller 53 may be configured so as to control the light projecting unit 40. The first controller 51, the second controller 52, and the third controller 53 may be configured so as to synchronize each other. The first controller 51 and at least one of the second controller 52 and the third controller 53 may be configured so as to synchronize each other. One of the first controller 51, the second controller 52, and the third controller 53 may be the master, and the other two may be the slaves. The controller 50 may be configured so as to be positioned above the first controller 51, the second controller 52, and the third controller 53. The controller 50 may further include an upper controller configured so as to control the first controller 51, the second controller 52, and the third controller 53.

The controller 50 is configured as, for example, a processor. The controller 50 may include one or more processors. The processor may include a general-purpose processor which loads a specific program and executes a specific function and a dedicated processor specialized for a specific process. The dedicated processors may include an application specific integrated circuit (ASIC). The processor may include a programmable logic device (PLD). The PLD may include an FPGA (Field-Programmable Gate Array). The controller 50 may be either a SoC (System-on-a-Chip) or a SiP (System In a Package) in which one or more processors cooperate. The controller 50 includes a storage unit, and the storage unit may store various kinds of information, a program for operating each component of the image display device 10, and the like. The storage unit may be composed of, for example, a semiconductor memory or the like. The storage unit may be configured so as to function as the work memory of the controller 50.

The display panel 20 is configured so as to display a left-eye image 23L (see FIG. 8) which is viewed by the user's left eye 5L, a right-eye image 23R (see FIG. 9) which is viewed by the user's right eye 5R, and a planar image 24 (see FIG. 10) which is viewed by both eyes of the user. The display panel 20 may be, for example, a liquid crystal device such as an LCD (Liquid Crystal Display). The display panel 20 may be a self-luminous device such as an organic EL (Electro-Luminescence) or an inorganic EL. In the case where the display panel 20 is a self-luminous device, the barrier panel 30 is located closer to the user than the display panel 20.

Figure 3:
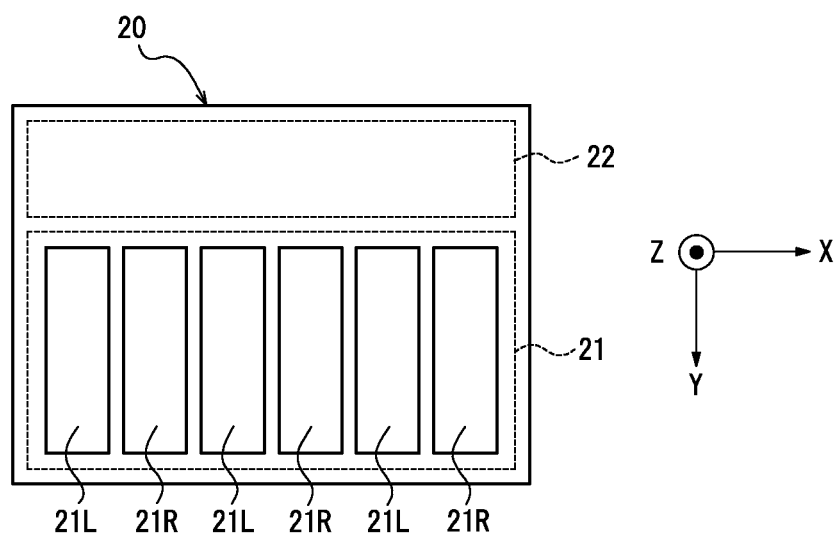
FIG. 3 is a plan view illustrating a configuration example of a display panel.

As illustrated in FIG. 3, the display panel 20 is configured so as to include a first display region 21 and a second display region 22. The display panel 20 is configured so as to include a plurality of left-eye visible regions 21L which are viewed by the left eye 5L of the user and a plurality of right-eye visible regions 21R which are viewed by the right eye 5R of the user, in the first display region 21. The display panel 20 is configured so as to display the left-eye image 23L in the plurality of left-eye visible regions 21L and display the right-eye image 23R in the plurality of right-eye visible regions 21R. That is, the display panel 20 is configured so as to display a parallax image in the plurality of left-eye visible regions 21L and the plurality of right-eye visible regions 21R. The plurality of left-eye visible regions 21L and the plurality of right-eye visible regions 21R are aligned in an X-axis direction. In the embodiment, a parallax direction is associated with the X-axis direction. The X-axis direction is also referred to as a horizontal direction or a first direction. A Y-axis direction is also referred to as a vertical direction or a second direction. The plurality of left-eye visible regions 21L and the plurality of right-eye visible regions 21R may be located at intervals as illustrated in FIG. 3, or may be adjacent to each other. The display panel 20 is configured so as to display the planar image 24 in the second display region 22.

As illustrated in FIG. 3, the plurality of left-eye visible regions 21L and the plurality of right-eye visible regions 21R may extend along the Y-axis direction, or may extend in a direction inclined at a predetermined angle with respect to the Y-axis direction. In other words, the plurality of left-eye visible regions 21L and the plurality of right-eye visible regions 21R may extend along a direction intersecting the parallax direction. The plurality of left-eye visible regions 21L and the plurality of right-eye visible regions 21R may be arranged alternately along a predetermined direction including components in the parallax direction. The pitch in which the plurality of left-eye visible regions 21L and the plurality of right-eye visible regions 21R are alternately arranged is also called a parallax image pitch.

The barrier panel 30 is configured so that the image light related to the left-eye image 23L reach the left eye 5L of the user and the image light related to the right-eye image 23R reach the right eye 5R of the user. The barrier panel 30 is configured so as to function as an active barrier.

Figure 4:
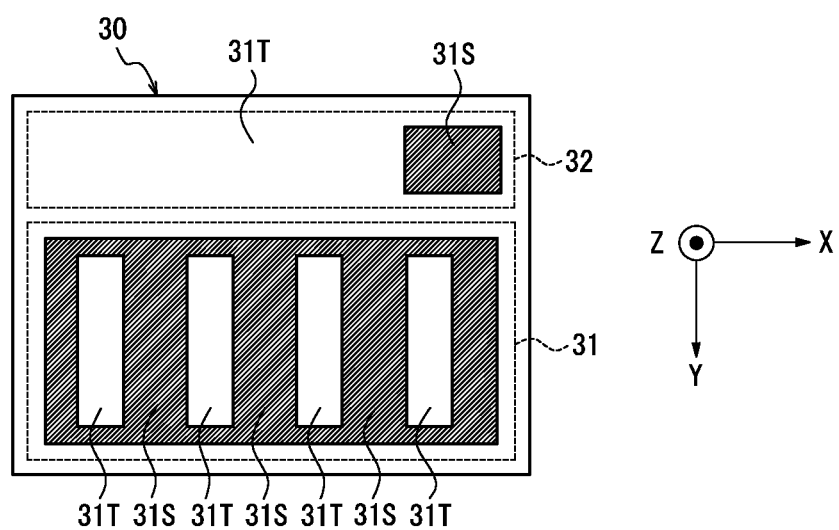
FIG. 4 is a plan view illustrating a configuration example of a barrier panel.

As illustrated in FIG. 4, the barrier panel 30 is configured so as to include a first barrier region 31 and a second barrier region 32. In the case where the barrier panel 30 is located closer to the user than the display panel 20 when viewed from the user, the barrier panel 30 is configured so as to control the transmittance of the image light emitted from the display panel 20. The first barrier region 31 corresponds to the first display region 21 and is configured so as to control the transmittance of image light emitted from the first display region 21. The barrier panel 30 is configured so as to include a plurality of light transmitting portions 31T and a plurality of dimming portions 31S in the first barrier region 31. The plurality of light transmitting portions 31T are configured so as to transmit light entering the barrier panel 30 from the display panel 20. The plurality of light transmitting portions 31T may be configured so as to transmit light with a transmittance equal to or higher than a first transmittance. The first transmittance may be, for example, 100%, or may be a value close to 100%. The plurality of dimming portions 31S are configured so as to dim the light entering the barrier panel 30 from the display panel 20. The plurality of dimming portions 31S may be configured so as to transmit light with a transmittance equal to or lower than a second transmittance. The second transmittance may be, for example, 0% or a value close to 0%. The first transmittance is greater than the second transmittance. The first transmittance may be a value smaller than 50%, for example, 10%, as long as a sufficient contrast with the light transmitted through the dimming portion 31S can be secured. The second transmittance may be a value larger than the vicinity of 0%, for example, 10%, as long as a sufficient contrast with the light transmitted through the light transmitting portion 31T can be secured. A sufficient contrast ratio may be, for example, 100:1.

In the case where the barrier panel 30 is located farther from the user than the display panel 20 when viewed from the user, the barrier panel 30 is configured so as to control the transmittance of light entering the display panel 20. The plurality of light transmitting portions 31T are configured so as to transmit light entering the display panel 20. The plurality of dimming portions 31S are configured so as to dim the light entering the display panel 20. By doing so, the first barrier region 31 is configured so as to control the transmittance of the light entering the first display region 21. An intensity of the image light emitted from the display panel 20 is controlled based on an intensity of the incident light. The traveling direction of the image light emitted from the display panel 20 is controlled based on the traveling direction of the incident light.

The plurality of light transmitting portions 31T are configured so that the image light related to the left-eye image 23L reach the left eye 5L of the user and the image light related to the right-eye image 23R reach the right eye 5R of the user. The plurality of dimming portions 31S are configured so as to prevent or make it difficult for the image light related to the left-eye image 23L to reach the right eye 5R of the user and is configured so as to prevent or make it difficult for the image light related to the right-eye image 23R to reach the left eye 5L of the user. The barrier panel 30 may be configured such that the user views the right-eye image 23R with the right eye 5R, while preventing or making it difficult for the left eye 5L to view the right-eye image 23R. The barrier panel 30 may be configured so that the user views the left-eye image 23L with the left eye 5L, while preventing or making it difficult for the right eye 5R to view the left-eye image 23L. The plurality of light transmitting portions 31T and the plurality of dimming portions 31S are configured so as to define the direction of the image light related to the parallax image including the left-eye image 23L and the right-eye image 23R.

The plurality of light transmitting portions 31T and the plurality of dimming portions 31S are arranged alternately in the X-axis direction. A boundary between the plurality of light transmitting portions 31T and the plurality of dimming portions 31S may be along the Y-axis direction as illustrated in FIG. 4, or may be along a direction which is inclined at a predetermined angle with respect to the Y-axis direction. The boundary between the plurality of light transmitting portions 31T and the plurality of dimming portions 31S may be along a direction intersecting the parallax direction. In other words, the plurality of light transmitting portions 31T and the plurality of dimming portions 31S may be alternately arranged along a predetermined direction including a component in the parallax direction.

The shape of the plurality of light transmitting portions 31T and the plurality of dimming portions 31S may be determined based on the shapes of the plurality of left-eye visible regions 21L and the plurality of right-eye visible regions 21R. Conversely, the shapes of the plurality of left-eye visible regions 21L and the plurality of right-eye visible regions 21R may be determined based on the shapes of the plurality of light transmitting portions 31T and the plurality of dimming portions 31S.

The second barrier region 32 corresponds to the second display region 22 and is configured so as to control the transmittance of the image light emitted from the second display region 22.

The barrier panel 30 may be constituted by a liquid crystal shutter. The liquid crystal shutter is configured so that the light transmittance can be controlled based on an applied voltage. The liquid crystal shutter is constituted by a plurality of pixels and may be configured so as to control the light transmittance in each pixel. The liquid crystal shutter may be configured so as to form a region having a high light transmittance or a region having a low light transmittance, in an arbitrary shape. In the case where the barrier panel 30 is constituted by a liquid crystal shutter, the light transmitting portion 31T may have a transmittance equal to or higher than the first transmittance. In the case where the barrier panel 30 is constituted by a liquid crystal shutter, the dimming portion 31S may have a transmittance of equal to or less than the second transmittance.

The display panel 20 and the barrier panel 30 each includes a plurality of pixels. An arrangement pitch of the plurality of pixels of the display panel 20 and an arrangement pitch of the plurality of pixels of the barrier panel 30 may be the same or different. In the embodiment, it is assumed that the arrangement pitch of the plurality of pixels of the display panel 20 and the arrangement pitch of the plurality of pixels of the barrier panel 30 are the same. In this case, each pixel of the display panel 20 and each pixel of the barrier panel 30 are associated with each other. Each pixel of the barrier panel 30 may be configured so as to be controlled by either the plurality of light transmitting portions 31T and the plurality of dimming portions 31S. The controller 50 may be configured so that the control of each pixel of the display panel 20 is synchronized with the control of each pixel of the associated barrier panel 30. Image quality can be improved by configuring the controls of each pixel of the display panel 20 and barrier panel 30 which are associated with each other to be synchronized.

The display panel 20 may be configured so as to display black on at least a part of the plurality of pixels included in the second display region 22. The region formed by the plurality of pixels displaying black is also referred to as a black display region. The controller 50 may be configured so that the plurality of dimming portions 31S are formed in a region corresponding to the black display region included in the second display region 22 in the barrier panel 30. By doing so, the transmittance of the image light in the black display region becomes even lower. As a result, the black display region looks even blacker to the user.

Figure 5:
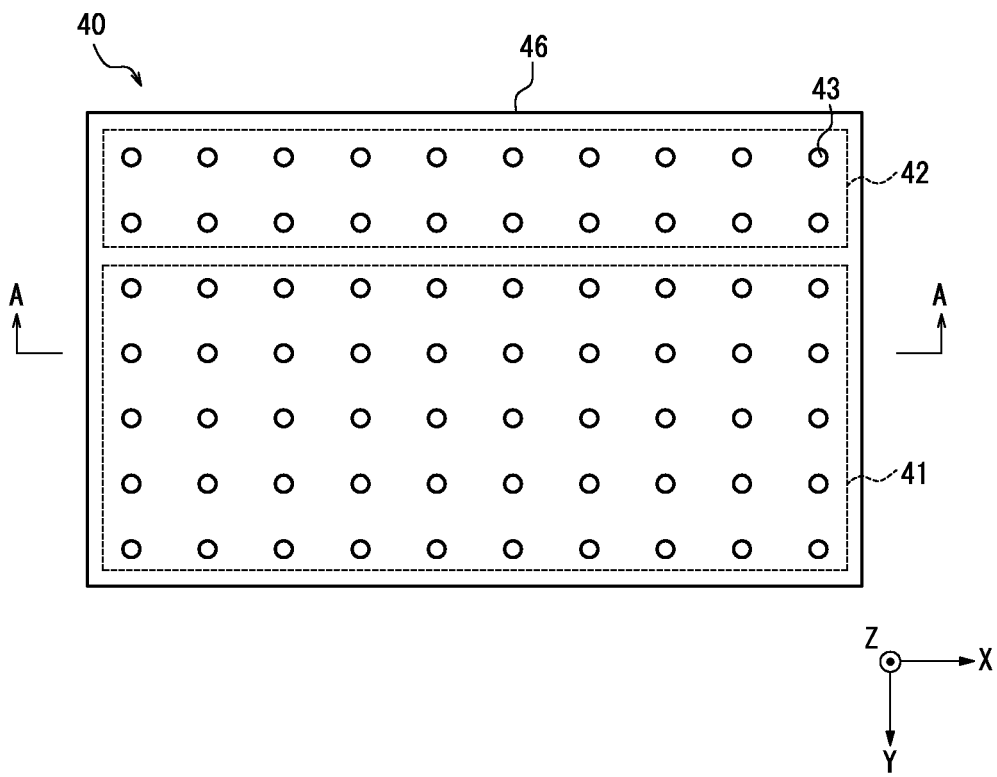
FIG. 5 is a plan view illustrating a configuration example of a light projecting unit.
Figure 6:
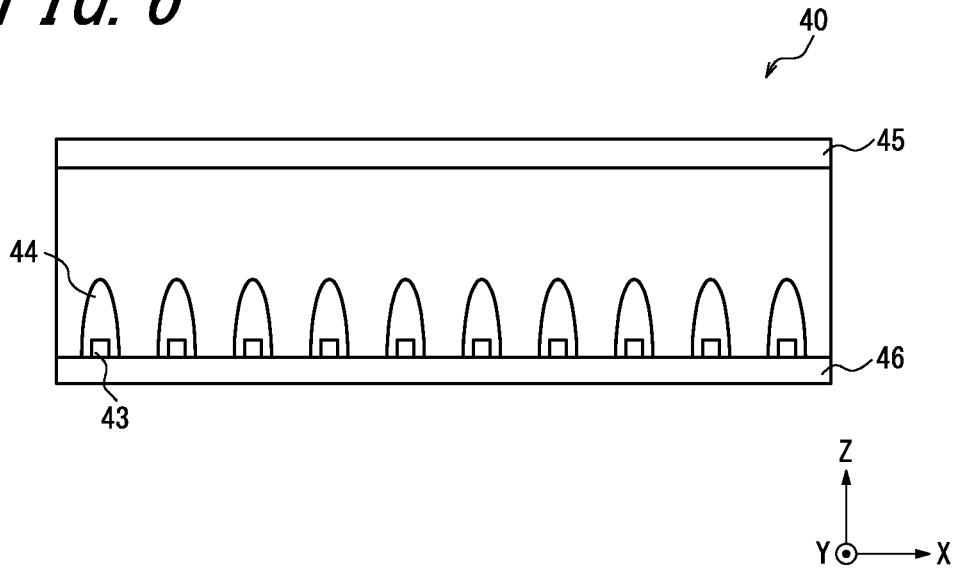
FIG. 6 is a cross-sectional view taken along the line A-A of FIG. 5.

As illustrated in FIGS. 5 and 6, the light projecting unit 40 includes a substrate 46 and a plurality of light emitting elements 43 arranged in a plane of the substrate 46. Each light emitting element 43 may be located at a grid point of a plane grid such as a rectangular grid or an oblique grid. As illustrated in FIG. 6, the light projecting unit 40 may include a lens 44 corresponding to each light emitting element 43. The lens 44 controls the traveling direction of the light emitted from each light emitting element 43. The light projecting unit 40 may include a diffuser plate 45. The diffuser plate 45 diffuses the light emitted from the plurality of light emitting elements 43 in the plane to reduce the variation in the in-plane brightness generated by discrete arrangement of the plurality of light emitting elements 43.

As illustrated in FIG. 5, the light projecting unit 40 is configured so as to include a first light emitting region 41 and a second light emitting region 42. A part of the plurality of light emitting elements 43 may be located in the first light emitting region 41. The other part of the plurality of light emitting elements 43 may be located in the second light emitting region 42. The light emitted from the first light emitting region 41 is configured so as to enter the first display region 21 and the first barrier region 31. The light emitted from the second light emitting region 42 is configured so as to enter the second display region 22 and the second barrier region 32.

The light projecting unit 40 may be configured so as to independently control the light quantity of each light emitting element 43. The light projecting unit 40 is configured so as to control the distribution of brightness in the plane by independently controlling the light quantity of each light emitting element 43.

The controller 50 may be configured so as to cause the light projecting unit 40 to reduce the light quantity of light emitted from the region corresponding to the black display region included in the second display region 22. By doing so, the light quantity of the image light in the black display region is further reduced. As a result, the black display region looks even blacker to the user.

The display panel 20 may be configured so as to further include a third display region. The display panel 20 may or may not be configured so that the third display region is associated with the first display region 21 and the second display region 22. The light projecting unit 40 may be configured so as to include a third light emitting region corresponding to the third display region. The light projecting unit 40 may or may not be configured so that the third light emitting region is associated with the first light emitting region 41 and the second light emitting region 42.

The controller 50 may be configured so that the control of the transmittance of each pixel included in the third display region is associated with the control of the light quantity of light emitted from the third light emitting region. The controller 50 may be configured so as to control the transmittance of each pixel included in the third display region and the light quantity of light emitted from the third light emitting region so that the brightness of the image does not change when viewed from the user. That is, the controller 50 may be configured so as to control the transmittance of each pixel included in the third display region and the light quantity of light emitted from the third light emitting region so as to prevent the light quantity reaching the left eye 5L and right eye 5R of the user from changing.

The controller 50 may be configured so that the light quantity of light emitted from the third light emitting region is reduced and the transmittance of each pixel included in the third display region is increased. The controller 50 may be configured so that, for example, in a case where the light quantity of light emitted from the third light emitting region is reduced by half, the transmittance of each pixel included in the third display region is doubled. The controller 50 may be configured so as to control the transmittance of each pixel included in the third display region based on the light quantity of light emitted from the third light emitting region so that the emitted light with a light quantity less than a predetermined light quantity and the emitted light with the predetermined light quantity reach both eyes of the user with light quantities close to each other. By doing so, it is possible to reduce the power consumption in the light projecting unit 40 while making it difficult for the user to recognize the change in the brightness of the image. The controller 50 may be configured so that the control of the light quantity for each light emitting element 43 is associated with the control of the transmittance of the pixel corresponding to the light emitting element 43.

Figure 7:
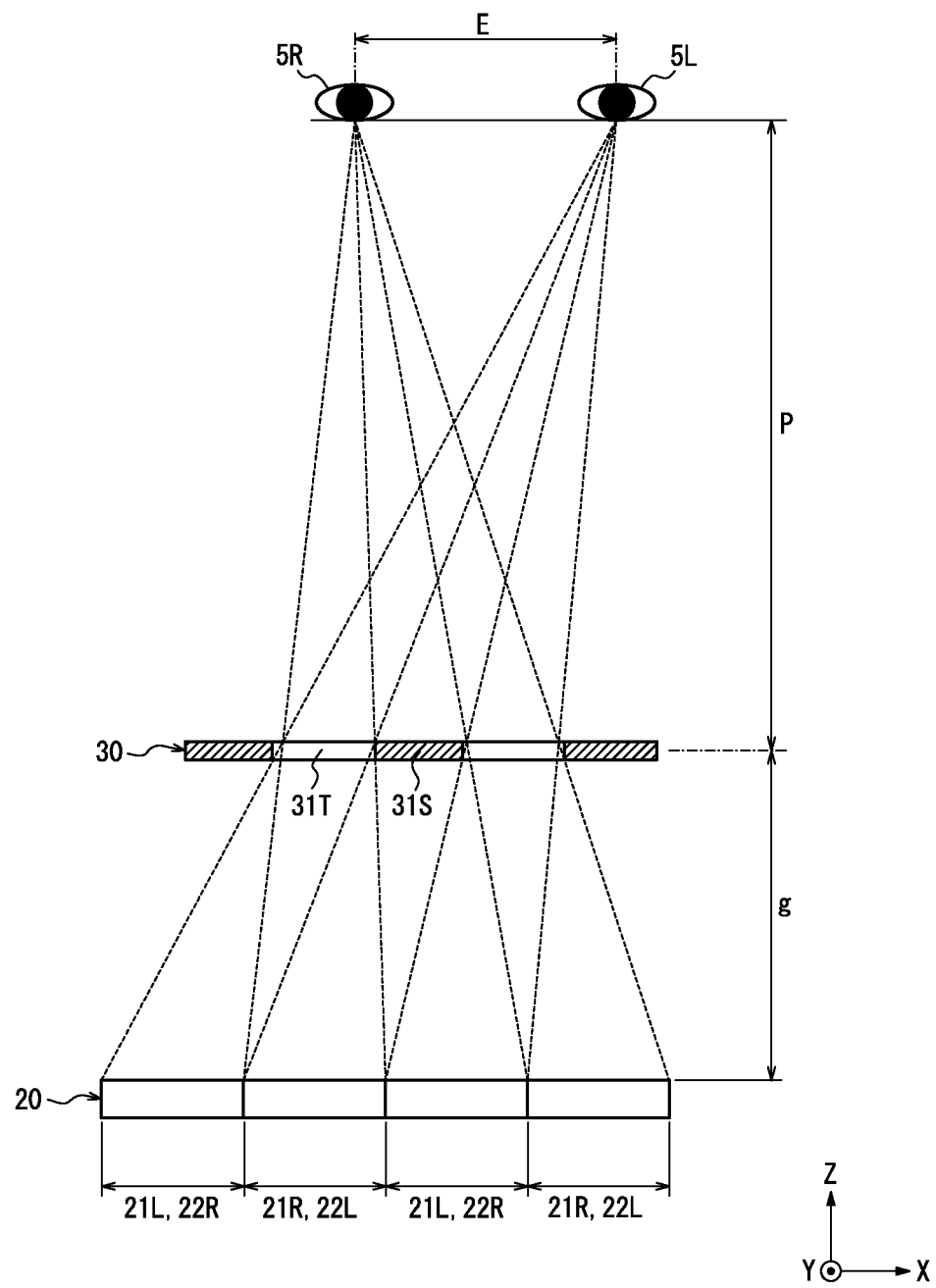
FIG. 7 is a diagram illustrating an example of how the image display device looks from a user's point of view.

In the configuration illustrated in FIG. 7, the barrier panel 30 is located between the left eye 5L and right eye 5R of the user and the display panel 20. The barrier panel 30 may be located on a side farther from the user than the display panel 20 when viewed from the user. The barrier panel 30 is located along the display panel 20. It can be said that the barrier panel 30 is located so as to overlap the display panel 20.

A distance between the left eye 5L and right eye 5R of the user and the barrier panel 30 is also called an observation distance and is expressed as P. A pitch in which the plurality of light transmitting portions 31T and the plurality of dimming portions 31S are alternately arranged in the X-axis direction is also called a barrier pitch. A distance between the left eye 5L and the right eye 5R is also called an inter-eye distance and is expressed as E. The distance between the barrier panel 30 and the display panel 20 is also called a gap and is expressed as g.

The display panel 20 is configured so as to include a plurality of left-eye visible regions 21L which can be viewed from the left eye 5L of the user via a plurality of light transmitting portions 31T and a plurality of left eye non-visible regions 22L which cannot be viewed or is difficult to be viewed from the left eye 5L of the user with a plurality of dimming portions 31S in the first display region 21. The plurality of left-eye visible regions 21L and the plurality of left eye non-visible regions 22L are alternately arranged in the X-axis direction. A position of a boundary between the plurality of left-eye visible regions 21L and the plurality of left eye non-visible regions 22L is determined by a position of a boundary between the plurality of light transmitting portions 31T and the plurality of dimming portions 31S, the distance (P) from the barrier panel 30 to both eyes of the user, and the gap (g).

The display panel 20 is configured so as to include a plurality of right-eye visible regions 21R which can be viewed from the right eye 5R of the user via a plurality of light transmitting portions 31T and a plurality of right eye non-visible regions 22R which cannot be viewed or is difficult to be viewed from the right eye 5R of the user with the plurality of dimming portions 31S in the first display region 21. The plurality of right-eye visible regions 21R and the plurality of right eye non-visible regions 22R are alternately arranged in the X-axis direction. A position of a boundary between the plurality of right-eye visible regions 21R and the plurality of right eye non-visible regions 22R is determined by the position of the boundary between the plurality of light transmitting portions 31T and the plurality of dimming portions 31S, the distance (P) from the barrier panel 30 to both eyes of the user, and the gap (g).

The display panel 20 may be configured so as to display a parallax image so that the region displaying the left-eye image 23L coincides with the plurality of left-eye visible regions 21L. The display panel 20 may be configured so as to display a parallax image so that the region displaying the right-eye image 23R coincides with the plurality of right-eye visible regions 21R. That is, the display panel 20 may be configured so as to display a parallax image based on the position of the boundary between the plurality of light transmitting portions 31T and the plurality of dimming portions 31S, the distance (P) from the barrier panel 30 to both eyes of the user, and the gap (g).

In the case where the plurality of left-eye visible regions 21L and the plurality of right-eye visible regions 21R overlap at least in part along the X-axis direction, crosstalk in which part of the left-eye image 23L is projected onto the right eye 5R and part of the right-eye image 23R is projected onto the left eye 5L, can occur. The crosstalk deteriorates the image quality of the parallax image projected on the user.

When the plurality of left-eye visible regions 21L and the plurality of right-eye visible regions 21R are alternately arranged in the X-axis direction without overlapping each other, the left eye 5L can view only the left-eye image 23L and the right eye 5R can view only the right-eye image 23R. In this case, crosstalk can be reduced. A state in which the left eye 5L and the right eye 5R can respectively view only the left-eye image 23L and the right-eye image 23R can be realized when the observation distance (P) is an optical viewing distance (OVD). The optical viewing distance is determined based on the inter-eye distance (E), the gap (g), the barrier pitch, and the parallax image pitch. In other words, the controller 50 may be configured so as to control the display panel 20 and the barrier panel 30 so that the observation distance (P) becomes an OVD. The controller 50 may be configured so as to control the shape and position of the plurality of light transmitting portions 31T and the plurality of dimming portions 31S on the barrier panel 30 and the shape and position of the right-eye image 23R and the left-eye image 23L to be displayed on the display panel 20 so that the observation distance (P) becomes an OVD.

The image display device 10 may further include a camera or the like configured so as to acquire the position of the eyes of the user. The controller 50 may be configured so as to control the display panel 20 and the barrier panel 30 based on the position of the eyes of the user. Crosstalk can be further reduced by configuring the controller 50 to control the first display region 21 and the first barrier region 31 based on the position of the eyes of the user. By configuring the controller 50 to control the second display region 22 and the second barrier region 32 based on the position of the eyes of the user, the black display region looks even blacker to the user.

The display panel 20 is configured so as to sequentially update the image to be displayed. In the case where the display panel 20 updates the display image, it can be considered that display panel 20 is displaying a moving image. The display panel 20 may be configured so as to display moving images by being configured so as to display a plurality of frames in sequence. In the embodiment, the entire display region of the display panel 20 is regarded as one frame. In the case where the entire display region is one frame, the display panel 20 is configured so as to sequentially display a plurality of frames by sequentially updating images displayed on the entire surface of the display surface. The number of frames that the display panel 20 displays per unit time is also known as a frame rate. The frame rate may be expressed as the number of frames that the display panel 20 displays per second.

The display panel 20 is configured so as to combine the parallax image including the right-eye image 23R and the left-eye image 23L displayed in the first display region 21 and the planar image 24 displayed in the second display region 22 and display the combined image as one frame.

The parallax image includes at least a part of the left-eye image 23L illustrated in FIG. 8 and at least a part of the right-eye image 23R illustrated in FIG. 9.

The left-eye image 23L illustrated in FIG. 8 includes a plurality of first sub-left-eye images 231L and a plurality of second sub-left-eye images 232L. The plurality of first sub-left-eye images 231L and the plurality of second sub-left-eye images 232L do not overlap each other. In the embodiment, it is assumed that the plurality of first sub-left-eye images 231L and the plurality of second sub-left-eye images 232L extend in the Y-axis direction and are alternately arranged in the left-eye image 23L in the X-axis direction. It is assumed that the total number of pixels in the X-axis direction of the plurality of first sub-left-eye images 231L is ½ or less of the total number of pixels in the X-axis direction of one left-eye image 23L. It is assumed that the total number of pixels in the X-axis direction of the plurality of second sub-left-eye images 232L is ½ or less of the total number of pixels in the X-axis direction of one left-eye image 23L. In other words, each full pixel left-eye image 23L is divided into a plurality of first sub-left-eye images 231L and a plurality of second sub-left-eye images 232L having half the number of pixels of the full pixel or less. The number of pixels of each first sub-left-eye image 231L can be different from the number of pixels of each second sub-left-eye image 232L.

The right-eye image 23R illustrated in FIG. 9 includes a plurality of first sub-right-eye images 231R and a plurality of second sub-right-eye images 232R. The plurality of first sub-right-eye images 231R and the plurality of second sub-right-eye images 232R do not overlap each other. In the embodiment, it is assumed that the plurality of first sub-right-eye images 231R and the plurality of second sub-right-eye images 232R extend in the Y-axis direction and are alternately arranged in the right-eye image 23R in the X-axis direction. It is assumed that the total number of pixels in the X-axis direction of the plurality of first sub-right-eye images 231R is ½ or less of the total number of pixels in the X-axis direction of one right-eye image 23R. It is assumed that the total number of pixels in the X-axis direction of the plurality of second sub-right-eye images 232R is ½ or less of the total number of pixels in the X-axis direction of one right-eye image 23R. In other words, each full pixel right-eye image 23R is divided into a plurality of first sub-right-eye images 231R and a plurality of second sub-right-eye images 232R having half the number of pixels of the full pixel or less. The number of pixels of each first sub-right-eye image 231R can be different from the number of pixels of each second sub-right-eye image 232R.

The plurality of first sub-left-eye images 231L and the plurality of first sub-right-eye images 231R do not overlap each other. By doing so, the display panel 20 can be configured so as to display the plurality of first sub-left-eye images 231L and the plurality of first sub-right-eye images 231R at the same time. The plurality of second sub-left-eye images 232L and the plurality of second sub-right-eye images 232R do not overlap each other. By doing so, the display panel 20 can be configured so as to display the plurality of second sub-left-eye images 232L and the plurality of second sub-right-eye images 232R at the same time.

Figure 10:
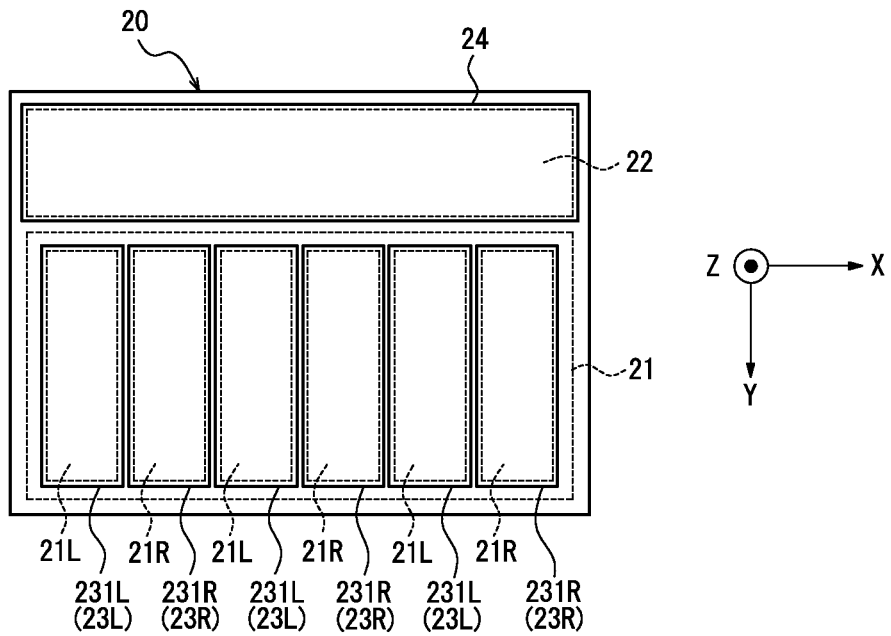
FIG. 10 is a diagram illustrating a display example of a display panel in a first subframe.

As illustrated in FIG. 10, the controller 50 is configured so as to cause the display panel 20 to display a frame, which includes the plurality of first sub-left-eye images 231L and the plurality of first sub-right-eye images 231R as one parallax image in the first display region 21. The controller 50 is configured so as to control the first barrier region 31 of the barrier panel 30 so that, in the display panel 20, the display region of each first sub-left-eye image 231L includes the left-eye visible region 21L and the display region of each first sub-right-eye image 231R includes the right-eye visible region 21R. The controller 50 may be configured so as to control the barrier panel 30 so that display regions of the plurality of first sub-left-eye images 231L and the plurality of first sub-right-eye images 231R respectively match the plurality of left-eye visible regions 21L and the plurality of right-eye visible regions 21R. The controller 50 may be configured so as to control the barrier panel 30 so that the plurality of left-eye visible regions 21L and the plurality of right-eye visible regions 21R respectively include display regions of the plurality of first sub-left-eye images 231L and the plurality of first sub-right-eye images 231R.

Figure 11:
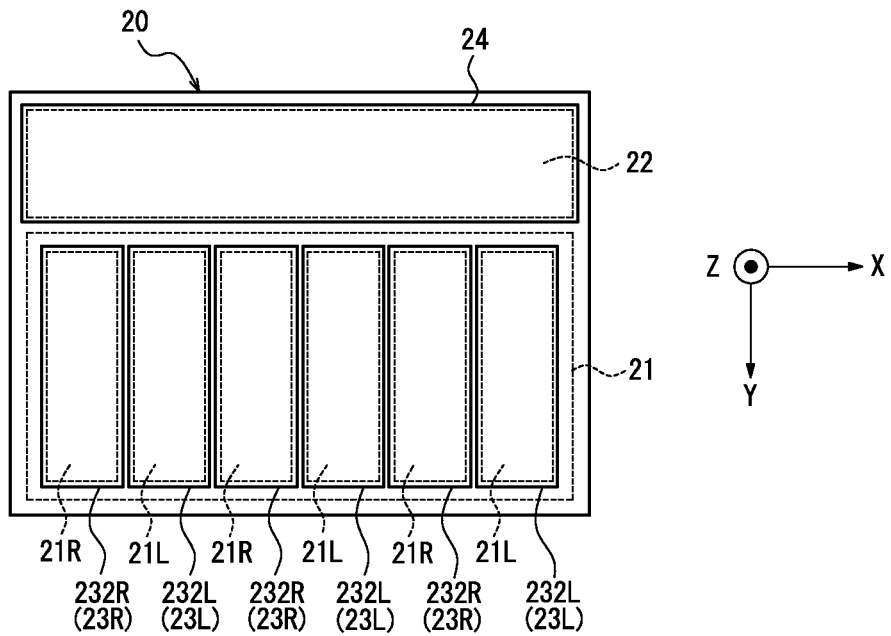
FIG. 11 is a diagram illustrating a display example of a display panel in a second subframe.

As illustrated in FIG. 11, the controller 50 is configured so as to cause the display panel 20 to display a frame, which includes the plurality of second sub-left-eye images 232L and the plurality of second sub-right-eye images 232R as one parallax image in the first display region 21. The controller 50 is configured so as to control the first barrier region 31 of the barrier panel 30 so that, in the display panel 20, the display region of each second sub-left-eye image 232L includes the left-eye visible region 21L and the display region of each second sub-right-eye image 232R includes the right-eye visible region 21R. The controller 50 may be configured so as to control the barrier panel 30 so that display regions of the plurality of second sub-left-eye images 232L and the plurality of second sub-right-eye image 232R respectively match the plurality of left-eye visible regions 21L and the plurality of right-eye visible regions 21R. The controller 50 may be configured so as to control the barrier panel 30 so that the plurality of left-eye visible regions 21L and the plurality of right-eye visible regions 21R respectively include display regions of the plurality of second sub-left-eye images 232L and the plurality of second sub-right-eye images 232R.

In the case where the user views the frame of FIG. 10 and the frame of FIG. 11 independently, the user views one of the plurality of first sub-left-eye images 231L and the plurality of second sub-left-eye images 232L as the plurality of left-eye images 23L. In the case where the user views the frame of FIG. 10 and the frame of FIG. 11 independently, the user views one of the plurality of first sub-right-eye images 231R and the plurality of second sub-right-eye images 232R as the plurality of right-eye images 23R. In this case, the number of pixels in the X-axis direction of each of the plurality of left-eye images 23L and the plurality of right-eye images 23R viewed by the user is equal to or less than half the number of pixels of the full pixel.

In the case where the user can see the frame of FIG. 10 and the frame of FIG. 11 together, the user can view one left-eye image 23L, which is a combination of the plurality of first sub-left-eye images 231L and the plurality of second sub-left-eye images 232L. One left-eye image 23L viewed by the user may include larger pixels than each of the plurality of first sub-left-eye images 231L and the plurality of second sub-left-eye images 232L. One left-eye image 23L viewed by the user can be a full pixel. The user can see one right-eye image 23R, which is a combination of the plurality of first sub-right-eye images 231R and the plurality of second sub-right-eye images 232R. One right-eye image 23R viewed by the user may have larger pixels than each of the plurality of first sub-right-eye images 231R and the plurality of second sub-right-eye images 232R. One right-eye image 23R viewed by the user can be a full pixel.

The controller 50 is configured so as to control the display panel 20 and the barrier panel 30 so that the user can view the frame of FIG. 10 and the frame of FIG. 11 as two consecutive frames. By doing so, the user can view an afterimage of the frame displayed on a first sheet and the image of the frame displayed on a second sheet as one image. As a result, in one embodiment, the user can view that one full pixel left-eye image 23L and one full pixel right-eye image 23R are both displayed via two consecutive frames. Image composition using afterimages in the eyes of the user is also called human sensory composition. The control of synthesizing a parallax image with an afterimage and making it viewable to the user is also called a composite display of the parallax image.

In the case where the frame of FIG. 10 and the frame of FIG. 11 are displayed as two consecutive frames, the controller 50 displays a portion located in the first display region 21 as two subframes. The subframe contains a parallax image. In the frame of FIG. 10, the part located at the first display region 21 is also referred to as a first subframe. In the frame of FIG. 11, the part located at the first display region 21 is also referred to as a second subframe. The controller 50 is configured so that frames are displayed so that one frame contains two subframes. That is, the controller 50 is configured so that two frames continuously displayed in the first display region 21 are displayed as one parallax image frame including the first subframe and the second subframe. The controller 50 may be configured so as to control the first barrier region 31 according to the parallax image displayed in the first display region 21. The controller 50 may be configured so as to control the parallax image displayed in the first display region 21 in accordance with the plurality of right-eye visible regions 21R and the plurality of left-eye visible regions 21L formed by the first barrier region 31. The controller 50 may be configured so that the plurality of second sub-left-eye images 232L are displayed in the region where the plurality of first sub-right-eye images 231R are displayed at the timing of changing the display from the first subframe to the second subframe. The controller 50 may be configured so that the plurality of second sub-right-eye images 232R are displayed in the region where the plurality of first sub-left-eye images 231L were displayed at the same timing. The controller 50 may be configured such that the display positions of the left-eye image 23L and the right-eye image 23R are interchanged on a subframe basis. The display position of the plurality of left-eye images 23L is included in the display attribute of the plurality of left-eye images 23L. The display position of the plurality of right-eye images 23R is included in the display attribute of the plurality of right-eye images 23R.

The controller 50 is configured so that a planar image frame including the planar image 24 is displayed in a part of the displayed frame, which is the part located in the second display region 22. The controller 50 is configured so as to control the second barrier region 32 of the barrier panel 30 according to the planar image 24 displayed in the second display region 22.

The controller 50 is configured so as to control the part located in the second display region 22 as two consecutive planar image frames when displaying the frame of FIG. 10 and the frame of FIG. 11 as two consecutive frames.

One frame is displayed simultaneously in the first display region 21 and the second display region 22. That is, the frame rate in the part displayed in the first display region 21 and the frame rate in the part displayed in the second display region 22 are the same. The frame rate of the subframe of the parallax image frame displayed in the first display region 21 is the same as the frame rate of the planar image frame displayed in the second display region 22. In other words, the frame rate of the parallax image frame displayed in the first display region 21 is half the frame rate of the planar image frame displayed in the second display region 22.

The image display device 10 according to the embodiment allows each of the user's eyes to view a parallax image with less image deterioration from full pixels in the first display region 21 and allows the user to view the planar image 24 with a large frame rate in the second display region 22. As a result, the image quality of the image display device 10 is improved.

The controller 50 is configured so as to control the plurality of light transmitting portions 31T and the plurality of dimming portions 31S of the barrier panel 30 so that the plurality of right-eye visible regions 21R are formed in the first display region 21 in each of the first and second subframes. The controller 50 may be configured so as to control the barrier panel 30 so that the plurality of right-eye visible regions 21R formed in the first subframe and the plurality of right-eye visible regions 21R formed in the second subframe do not overlap each other. The controller 50 is configured so as to control the plurality of light transmitting portions 31T and the plurality of dimming portions 31S of the barrier panel 30 so that the plurality of left-eye visible regions 21L are formed in the first display region 21 in each of the first and second subframes. The controller 50 may be configured so as to control the barrier panel 30 so that the plurality of left-eye visible regions 21L formed in the first subframe and the plurality of left-eye visible regions 21L formed in the second subframe do not overlap each other. The controller 50 may be configured so that a part of the right-eye image 23R and a part of the left-eye image 23L are displayed on the display panel 20 according to the plurality of formed right-eye visible regions 21R and the plurality of formed left-eye visible regions 21L.

In the embodiment, the controller 50 may be configured so as to control the display panel 20 and the barrier panel 30 so that the position of the eyes of the user is the same until a new parallax image frame is displayed while displaying one parallax image frame. That is, in the case where the position of the user's eyes differs between the first subframe and the second subframe, the controller 50 may be configured so that the right-eye visible region 21R is formed, assuming that the eye-positions in each subframe are the same.

In the case where the second subframe included in the same parallax image frame is displayed following the first subframe, the controller 50 may be configured so that the positions of the plurality of right-eye visible regions 21R in the second subframe are determined based on the positions of the plurality of right-eye visible regions 21R in the first subframe. In this case, the controller 50 is configured so that the positions of the plurality of right-eye visible regions 21R are determined, not based on the position of the eyes of the user.

In the case where the first subframe of a new parallax image frame is displayed following the second subframe, the controller 50 may be configured so that the positions of the plurality of right-eye visible regions 21R in the first subframe are determined, not based on the positions of the plurality of right-eye visible regions 21R in the second subframe. In this case, the controller 50 is configured so that the positions of the plurality of right-eye visible regions 21R are determined based on the position of the eyes of the user, not based on the position of the plurality of right-eye visible regions 21R in the second subframe which is displayed immediately before.

It is supposed that, when the eye-position of the eyes of the user is different between the first subframe and the second subframe, the plurality of right-eye visible regions 21R are formed based on the eye-position in each subframe. In this case, at least one of the plurality of first sub-right-eye images 231R displayed in the first subframe and the plurality of second sub-right-eye images 232R displayed in the second subframe may be displayed out of alignment with respect to the plurality of right-eye visible regions 21R. This phenomenon is caused by the fact that the plurality of first sub-right-eye images 231R and the plurality of second sub-right-eye images 232R do not overlap each other. In the case where this phenomenon occurs, crosstalk occurs.

In the case where the plurality of second sub-right-eye images 232R are changed according to the change of the eye-position of the eyes of the user, the plurality of first sub-right-eye images 231R and the plurality of second sub-right-eye images 232R overlap at least in part. As a result, the image quality of one right-eye image 23R seen by the user deteriorates.

Up to this point, as the description regarding the right eye 5R, a display mode of the plurality of right-eye images 23R in the plurality of right-eye visible regions 21R is described. However, the display mode of the plurality of left-eye images 23L in the plurality of left-eye visible regions 21L can be explained in the same manner as or similar to the description regarding the right eye 5R.

According to the image display device 10 according to the embodiment, control is carried out under the condition that it is assumed that the position of the eyes of the user is the same while one parallax image frame is displayed. By doing so, crosstalk is less likely to occur and the quality of the image seen by the user is less likely to deteriorate.

Figure 12:
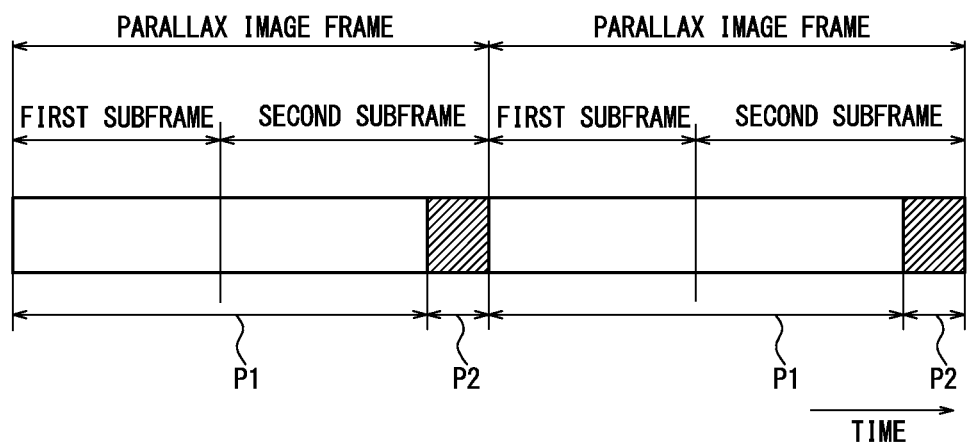
FIG. 12 is a timing chart illustrating a control timing of a first light emitting region.

The controller 50 displays the part located in the first display region 21 as one parallax image frame including the first subframe and the second subframe. The controller 50 is configured so as to control the first light emitting region 41 corresponding to the first display region 21 according to the change of the parallax image frame. That is, the controller 50 is configured so as to control the first light emitting region 41 for each parallax image frame. The controller 50 may be configured so as to control the first light emitting region 41 by dividing each parallax image frame into two periods represented by P1 and P2, as illustrated in FIG. 12. In FIG. 12, it is assumed that the time advances as the period is located on the right side. The period represented by P1 includes a period from a start to an end of the first subframe and a period from a start of the second subframe to the elapse of a predetermined time. The period represented by P2 includes the period from the end of the period represented by P1 to the end of the second subframe and includes the timing of the change from the displayed parallax image frame to a new parallax image frame. The period represented by P2 is also called a frame change period. The controller 50 may be configured so as to control the first light emitting region 41 by dividing the period during which one parallax image frame is displayed into a period represented by P1 and a period represented by P2.

The controller 50 is configured so that the light quantity of light emitted from the first light emitting region 41 is set to a first light quantity which matches the display of the first display region 21 during the period represented by P1. The controller 50 may be configured so that the overall brightness of the first display region 21 is dimmed by being configured so as to set the light quantity of light emitted from the first light emitting region 41 to a second light quantity less than the first light quantity in the period represented by P2. The controller 50 may be configured so that the entire first display region 21 is displayed in black by being configured not to emit light from the first light emitting region 41 during the period represented by P2. The shaded hatches attached to the period represented by P2 correspond to the fact that the entire first display region 21 is displayed in black or the overall brightness of the first display region 21 is reduced. A display state in which the overall brightness is low is also referred to as a low-brightness display.

The controller 50 is configured so that the control corresponding to the period represented by P2 is ended and the display of one parallax image frame is ended. The controller 50 is configured so that the control corresponding to the period represented by P1 is newly started and a new parallax image frame is displayed. By making the entire first display region 21 black or low-brightness display before the timing at which the displayed parallax image frame is switched, the user is less likely to feel the afterimage of the frame which is displayed before the switch. As a result, the image quality is improved.

The controller 50 is configured so that the light quantity of light emitted from the first light emitting region 41 is not reduced at the timing of switching from the first subframe to the second subframe and so that the light emitted from the first light emitting region 41 is kept. By doing so, the user can easily feel the afterimage of the image displayed in the first subframe. By doing so, the user feels that the user is viewing both the right-eye image 23R and the left-eye image 23L of the full pixels, which is a combination of the afterimage of the first subframe and the real image displayed in the second subframe. As a result, the image quality is improved.

The controller 50 is configured so as to control the brightness of the light emitted from the light projecting unit 40 for each period in which the parallax image frame is divided into two. By doing so, the controller 50 is configured so that a situation in which the user is likely to feel an afterimage between subframes is generated and so that a situation in which the user is less likely to feel an afterimage between parallax image frames is generated. As a result, the image quality is improved.

Figure 13:
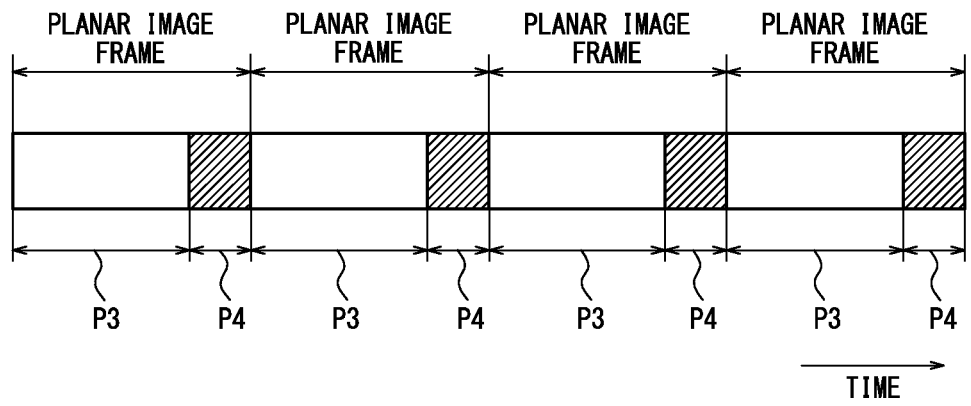
FIG. 13 is a timing chart illustrating a control timing of a second light emitting region.

The controller 50 is configured so as to cause the part located in the second display region 22 to display a planar image frame including the planar image 24. The controller 50 is configured so as to control the second light emitting region 42, which corresponds to the second display region 22, in association with the planar image frame change. That is, the controller 50 is configured so as to control the second light emitting region 42 for each planar image frame. The controller 50 may be configured so as to control the second light emitting region 42 by dividing each planar image frame into a period represented by P3 and a period represented by P4, as illustrated in FIG. 13. In FIG. 13, it is assumed that the time advances as the period is located on the right side. The period represented by P3 corresponds to a period from a start of the planar image frame to the elapse of a predetermined time. The period represented by P4 corresponds to a period from an end of the period represented by P3 to an end of the planar image frame and includes the timing of the change from the displayed planar image frame to a new planar image frame.

The controller 50 is configured so that the light quantity of light emitted from the second light emitting region 42 is set to a third light quantity which matches the display of the second display region 22 during the period represented by P3. The controller 50 may be configured so that the entire second display region 22 is displayed in low brightness by being configured so that the light quantity of light emitted from the second light emitting region 42 is set to a fourth light quantity less than the third light quantity during the period represented by P4. The controller 50 may be configured so that the entire second display region 22 is displayed in black by being configured not to emit light from the second light emitting region 42 during the period represented by P4. The shaded hatching attached to the period represented by P4 corresponds to the entire second display region 22 being displayed in black or in low brightness.

The controller 50 is configured so that the control corresponding to the period represented by P4 is ended and the display of one planar image frame is ended. The controller 50 is configured so that the control corresponding to the period represented by P3 is started and a new planar image frame is displayed. By making the entire second display region 22 black or low-brightness before the timing at which the displayed planar image frame is switched, the user is less likely to feel the afterimage of the frame which is displayed before the switch. As a result, the image quality is improved.

The controller 50 is configured so as to control the brightness of the light emitted from the light projecting unit 40 every period of dividing the planar image frame into two. Therefore, the controller 50 can be configured so that a situation where the user is less likely to feel an afterimage between planar image frames is generated. As a result, the image quality is improved.

The period represented by P3 during which the second light emitting region 42 is controlled is included in the period represented by P1 during which the first light emitting region 41 is controlled. The period represented by P4 during which the second light emitting region 42 is controlled coincides with the period represented by P2 during which the first light emitting region 41 is controlled, or is included in the period represented by P1. In the case where there are two periods represented by P4, one period matches the period represented by P2. The other period is included in the period represented by P1. The period represented by P4 is also called a planar image frame change period.

The controller 50 is configured so that the entire first display region 21 is displayed in black or low brightness during the frame change period, and also the controller 50 is configured so that the entire second display region 22 is displayed in black or in low brightness. Although the controller 50 is configured so that the first display region 21 is displayed in neither black nor low brightness during the subframe change period, the controller 50 is configured so that the entire second display region 22 is displayed in black or in low brightness. By doing so, the user can easily feel the afterimage between the subframes and the user can hardly feel the afterimage between the parallax image frames and the planar image frames. As a result, the image quality is improved.

The controller 50 is configured so that the entire first display region 21 and the entire second display region 22 are displayed in black or in low brightness during the periods represented by P2 and P4, respectively. While the entire first display region 21 and the entire second display region 22 are displayed in black or low brightness, the user views a black image or a low-brightness image. Depending on the black display or the low-brightness display, the brightness of the image seen by the user changes with the passage of time even within one parallax image frame or one planar image frame. In this case, a time average value of the brightness of the image in one parallax image frame or one planar image frame decreases. That is, the brightness of the image viewed from the user is reduced as a whole. By shortening the time for black display or low-brightness display, the brightness of the image viewed from the user is increased. By shortening the period represented by each of P2 and P4, the period of black display or low-brightness display is shortened. By doing so, the time average value of the brightness of the image in one parallax image frame or one planar image frame increases. As a result, the brightness of the image viewed from the user is increased.

In a device according to a comparative example, the display panel 20 is configured so as to display black for a predetermined period while displaying one frame so that the user is less likely to feel an afterimage between frames. In the comparative example, the display panel 20 is configured so as to control each pixel with a halftone. A response speed of the pixel to the control of changing from black display to halftone is slower than a speed of increasing or decreasing the light quantity of light emitted from the light projecting unit 40. As a result, in the device according to the comparative example, the period of black display is difficult to shorten. In other words, the image display device 10 according to the embodiment can easily shorten the period during which the pixels are displayed in black as compared with the device according to the comparative example. As a result, the image display device 10 according to the embodiment can further increase the brightness of the image as compared with the device according to the comparative example.

The controller 50 is configured so that the light quantity of light emitted from the first light emitting region 41 is made different from the light quantity of light emitted from the second light emitting region 42. For example, the controller 50 is configured so that the light quantity of light emitted from the first light emitting region 41 is made different from the light quantity of light emitted from the second light emitting region 42 in a period in which the period represented by P1 in FIG. 12 and the period represented by P4 in FIG. 13 overlap.

The controller 50 may be configured so that the light quantity of light emitted from the first light emitting region 41 is made different from the light quantity of light emitted from the second light emitting region 42 even in a period in which the period represented by P1 in FIG. 12 and the period represented by P3 in FIG. 13 overlap.

The controller 50 may be configured so that the light quantity of light emitted from the first light emitting region 41 is made greater than the light quantity of light emitted from the second light emitting region 42. The controller 50 may be configured so that the light quantity of light emitted from the first light emitting region 41 is made close to twice the light quantity of light emitted from the second light emitting region 42. By doing so, the brightness of one parallax image frame displayed by combining two subframes in the first display region 21 can be brought close to the brightness of the planar image frame displayed in the second display region 22. As a result, the user is less likely to feel the difference in brightness between the parallax image and the planar image 24.

Figure 14:
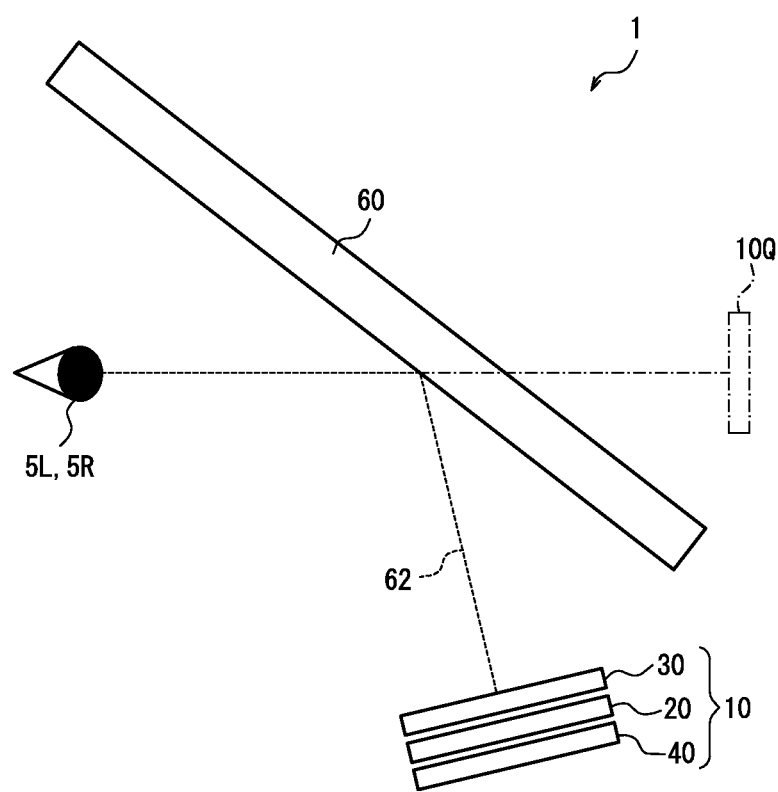
FIG. 14 is a diagram illustrating a configuration example of an image display system according to an embodiment.

As illustrated in FIG. 14, an image display system 1 according to an embodiment includes an image display device 10 and a reflective member 60. The image display system 1 causes the image display device 10 to display an image and emits image light. The image light is reflected by the reflective member 60 along a path 62 indicated by a broken line and reach the left eye 5L and right eye 5R of the user. When the image light is entering the eyes of the user, the user can view the image displayed on the image display device 10. By viewing the image light reflected by the reflective member 60, the user views the image displayed on the image display device 10 as a virtual image 10Q. The virtual image 10Q is located at the end of a route extending the path 62 connecting the left eye 5L and right eye 5R of the user and the reflective member 60 to an opposite side with respect to the reflective member 60. The image display system 1 may be a head-up display (HUD). The image display system 1 and the image display device 10 may provide the user with stereoscopic vision by being directly viewed by the user.

In the case where the user views the reflective member 60 of the image display system 1, the user can view the virtual image 10Q and a background which can be seen through the reflective member 60. In other words, from the point of view of the user, the virtual image 10Q appears to be superimposed on the background. In the case where the brightness of the virtual image 10Q is higher than the brightness of the background, the user is less likely to view the background. In the case where the brightness of the virtual image 10Q is lower than the brightness of the background, the user can easily view the background.

The controller 50 may be configured so that the light quantity of light emitted from the second light emitting region 42 is made greater than the light quantity of light emitted from the first light emitting region 41. By doing so, the brightness of the planar image 24 displayed in the second display region 22 is increased. As a result, the user is less likely to view the background in the region where the planar image 24 is displayed. The user can view the planar image 24 without being affected by the background.

The image display system 1 according to the embodiment may be mounted on a movable body. In the case where the image display system 1 is mounted on a movable body, the user of the image display system 1 may be a driver or operator of the movable body, or a passenger. In the case where the image display system 1 is mounted on the movable body, a part of the configuration of the image display system 1 may be shared with other devices and parts included in the movable body. For example, a windshield of the movable body may also be used as part of the configuration of the image display system 1. For example, the reflective member 60 illustrated in FIG. 1 may be replaced by the windshield of the movable body.

"Movable body" in the disclosure includes vehicles, ships, and aircrafts. The "Vehicles" in the disclosure include, but are not limited to, automobiles and industrial vehicles, and may include railroad vehicles, living vehicles, and fixed-wing aircrafts traveling on a runway. The automobiles include, but are not limited to, passenger cars, trucks, buses, motorcycles, trolley buses, and the like, and may include other vehicles traveling on a road. The industrial vehicles include industrial vehicles for agriculture and construction. The industrial vehicles include, but are not limited to, forklifts and golf carts. The industrial vehicles for agriculture include, but are not limited to, tractors, tillers, transplanters, binders, combines, and lawnmowers. The industrial vehicles for construction include, but are not limited to, bulldozers, scrapers, excavators, cranes, dump trucks, and road rollers. The vehicles include those which travel manually. The classification of vehicles is not limited to the above. For example, the automobiles may include industrial vehicles capable of traveling on a road and the same vehicle may be included in a plurality of classifications. The ships in the disclosure include marine jets, boats, and tankers. The aircrafts in the disclosure include fixed-wing aircrafts and rotorcrafts.

The configuration according to the disclosure is not limited only to the embodiments described above and can be modified or changed in many ways. For example, the functions and the like included in each component and the like can be rearranged so as not to be logically inconsistent, and a plurality of components and the like can be combined into one or divided.

The diagrams illustrating the configuration according to the disclosure are schematic. The dimensional ratios on the drawings do not always match the actual ones.

In the disclosure, the descriptions such as "first" and "second" are identifiers for distinguishing the configuration. The configurations distinguished by the descriptions such as "first" and "second" in the disclosure can exchange numbers in the relevant configurations. For example, the first region can exchange the identifiers "first" and "second" with the second region. The exchange of identifiers takes place at the same time. Even after exchanging identifiers, the configuration is distinguished. The identifier may be removed. The configuration with the identifier removed is distinguished by reference numerals and letters. Based solely on the description of identifiers such as "first" and "second" in this disclosure, it shall not be used as a basis for interpreting the order of the configurations or for the existence of identifiers with smaller numbers.

In the disclosure, the X-axis, Y-axis, and Z-axis are provided for convenience of explanation and may be interchanged with each other. The configuration according to the disclosure is described using a Cartesian coordinate system composed of the X-axis, the Y-axis, and the Z-axis. The positional relationship of each configuration according to the disclosure is not limited to being orthogonal.

REFERENCE SIGNS LIST

1: Image display system
5L, 5R: Left eye, Right eye
10: Image display device
10Q: Virtual image
20: Display panel
21, 22: First display region, Second display region
21L, 21R: Left-eye visible region, Right-eye visible region
22L, 22R: Left eye non-visible region, Right eye non-visible region
23L, 23R: Left-eye image, Right-eye image
231L, 231R: First sub-left-eye image, First sub-right-eye image
232L, 232R: Second sub-left-eye image, Second sub-right-eye image
24: Planar image
30: Barrier panel
31: First barrier region
31T: Light transmitting portion
31S: Dimming portion
32: Second barrier region
40: Light projecting unit
41: First light emitting region
42: Second light emitting region
43: Light emitting element
44: Lens
45: Diffuser plate
46: Substrate
50: Controller
51, 52, 53: First controller, Second controller, Third controller
60: Reflective member
62: Path

The invention claimed is:
1. An image display device, comprising:
a light projecting unit comprising a plurality of light emitting elements;
a display panel which is located so as to receive light from the light projecting unit and is configured so as to display a plurality of frames;
a barrier panel configured so as to overlap the display panel and include a plurality of light transmitting portions and a plurality of dimming portions; and
a controller configured so as to control the light projecting unit, the display panel, and the barrier panel,
a traveling direction of at least part of image light emitted from the display panel being divided for a right eye and a left eye of a user, by the plurality of light transmitting portions and the plurality of dimming portions,
the display panel being configured so as to include a first display region and a second display region which displays a planar image which is viewed by both eyes of the user, and
to display a right-eye image which is viewed by the right eye of the user, in a right-eye visible region of the first display region, and a left-eye image which is viewed by the left eye of the user, in a left-eye visible region of the first display region,
the barrier panel being configured so as to include a first barrier region corresponding to the first display region,
configured so that the plurality of light transmitting portions and the plurality of dimming portions are formed in the first barrier region so that the right-eye visible region and the left-eye visible region are at different positions of the first display region,
configured so as to further include a second barrier region corresponding to the second display region, and
configured so that the plurality of light transmitting portions and the plurality of dimming portions are formed in the second barrier region in accordance with the planar image displayed in the second display region,
the light projecting unit being configured so as to include a first light emitting region corresponding to the first display region and a second light emitting region corresponding to the second display region,
the controller being configured so that, in a case where two consecutive frames are displayed, a portion located in the first display region is displayed as one parallax image frame including a first subframe and a second subframe,
configured so as to control, for each parallax image frame, display of a parallax image in the first display region and formation of the plurality of light transmitting portions and the plurality of dimming portions in the first barrier region so that an image displayed in each of the first subframe and the second subframe included in the one parallax image frame is combined and viewed as one parallax image by the user,
configured so that, in a case where the two consecutive frames are displayed, a portion located in the second display region is displayed as two planar image frames,
configured so as to control, for each planar image frame, display of the planar image in the second display region and formation of the plurality of light transmitting portions and the plurality of dimming portions in the second barrier region,
configured so that a frame rate of a subframe included in the parallax image frame and a frame rate of the planar image frame are a same,
configured so that a light quantity of light emitted from the first light emitting region is reduced during a frame change period which includes a timing of changing display from the parallax image frame to a new parallax image frame, and configured so that a light quantity in the second light emitting region is reduced, but a light quantity in the first light emitting region is not reduced during a subframe change period which includes a timing of changing display from the first subframe to the second subframe in the first display region.

2. The image display device according to claim 1, wherein the controller is configured so that, in a case where the second subframe is displayed following the first subframe in the first display region, positions of the right-eye visible region and the left-eye visible region in the second subframe are determined based on respective positions of the right-eye visible region and the left-eye visible region in the first subframe, and the controller is configured so that, in a case where the first subframe is displayed following the second subframe in the first display region, positions of the right-eye visible region and the left-eye visible region in the first subframe are determined, not based on respective positions of the right-eye visible region and the left-eye visible region in the second subframe displayed immediately before, but based on an eye-position of the eyes of the user.

3. The image display device according to claim 1, wherein the controller is configured so that a light quantity of light emitted from the first light emitting region is made different from a light quantity of light emitted from the second light emitting region.

4. The image display device according to claim 3, wherein the controller is configured so that the light quantity of light emitted from the first light emitting region is made greater than the light quantity of light emitted from the second light emitting region.

5. The image display device according to claim 4, wherein the controller is configured so that the light quantity of light emitted from the first light emitting region is made close to twice the light quantity of light emitted from the second light emitting region.

6. The image display device according to claim 3, wherein the controller is configured so that the light quantity of light emitted from the second light emitting region is made greater than the light quantity of light emitted from the first light emitting region.

7. The image display device according to claim 1, wherein the display panel is configured so as to include a black display region in at least a part of the second display region, and the controller is configured so that a light quantity of light emitted from a region corresponding to the black display region in the second light emitting region is reduced.

8. The image display device according to claim 1, wherein the display panel is configured so as to include a black display region in at least a part of the second display region, and the controller is configured so that the plurality of dimming portions in a region corresponding to the black display region in the second barrier region are formed in the barrier panel.

9. The image display device according to claim 8, wherein the controller is configured so as to control, for each planar image frame, formation of the plurality of light transmitting portions and the plurality of dimming portions in the second barrier region, based on the eye-position of the eye of the user.

10. The image display device according to claim 1, wherein the right-eye image comprises a first sub-right-eye image displayed in the first subframe and a second sub-right-eye image displayed in the second subframe, the left-eye image comprises a first sub-left-eye image which is displayed in the first subframe and does not overlap with the first sub-right-eye image and a second sub-left-eye image which is displayed in the second subframe and does not overlap with the second sub-right-eye image, and the controller is configured so that the second sub-left-eye image is displayed in a region where the first sub-right-eye image is displayed at a timing of changing display from the first subframe to the second subframe, and configured so that the second sub-right-eye image is displayed in a region where the first sub-left-eye image was displayed.

11. The image display device according to claim 1, wherein the display panel is configured so as to include a third display region, the light projecting unit is configured so as to include a third light emitting region corresponding to the third display region, and the controller is configured so that a light quantity of light emitted from the third light emitting region is reduced and transmittance in the third display region is increased.

12. The image display device according to claim 1, wherein the controller comprises a first controller which controls the display panel, a second controller which controls the barrier panel, and a third controller which controls the light projecting unit, and the first controller and at least one of the second controller and the third controller are configured so as to synchronize each other.

13. An image display system, comprising:
an image display device comprising
a light projecting unit comprising a plurality of light emitting elements;
a display panel which is located so as to receive light from the light projecting unit and is configured so as to display a plurality of frames;
a barrier panel configured so as to overlap the display panel and include a plurality of light transmitting portions and a plurality of dimming portions; and
a controller configured so as to control the light projecting unit, the display panel, and the barrier panel; and
a reflective member,
a traveling direction of at least part of image light emitted from the display panel being divided for a right eye and a left eye of a user, by the plurality of light transmitting portions and the plurality of dimming portions,
the display panel being configured so as to include a first display region and a second display region which displays a planar image which is viewed by both eyes of the user, and
to display a right-eye image which is viewed by the right eye of the user, in a right-eye visible region of the first display region, and a left-eye image which is viewed by the left eye of the user, in a left-eye visible region of the first display region,
the barrier panel being configured so as to include a first barrier region corresponding to the first display region, configured so that the plurality of light transmitting portions and the plurality of dimming portions are formed in the first barrier region so that the right-eye visible region and the left-eye visible region are at different positions of the first display region, configured so as to further include a second barrier region corresponding to the second display region, and configured so that the plurality of light transmitting portions and the plurality of dimming portions are formed in the second barrier region in accordance with the planar image displayed in the second display region, the light projecting unit being configured so as to include a first light emitting region corresponding to the first display region and a second light emitting region corresponding to the second display region, the controller being configured so that, in a case where two consecutive frames are displayed, a portion located in the first display region is displayed as one parallax image frame including a first subframe and a second subframe, configured so as to control, for each parallax image frame, display of a parallax image in the first display region and formation of the plurality of light transmitting portions and the plurality of dimming portions in the first barrier region so that an image displayed in each of the first subframe and the second subframe included in the one parallax image frame is combined and viewed as one parallax image by the user, configured so that, in a case where the two consecutive frames are displayed, a portion located in the second display region is displayed as two planar image frames, configured so as to control, for each planar image frame, display of the planar image in the second display region and formation of the plurality of light transmitting portions and the plurality of dimming portions in the second barrier region, configured so that a frame rate of a subframe included in the parallax image frame and a frame rate of the planar image frame are a same, configured so that a light quantity of light emitted from the first light emitting region is reduced during a frame change period which includes a timing of changing display from the parallax image frame to a new parallax image frame, and configured so that a light quantity in the second light emitting region is reduced, but a light quantity in the first light emitting region is not reduced during a subframe change period which includes a timing of changing display from the first subframe to the second subframe in the first display region, the reflective member reflecting the image light and causing the image light to reach the left eye and the right eye of the user.

14. A movable body, comprising:

an image display system mounted on the movable body, comprising an image display device comprising a light projecting unit comprising a plurality of light emitting elements;

a display panel which is located so as to receive light from the light projecting unit and is configured so as to display a plurality of frames;

a barrier panel configured so as to overlap the display panel and include a plurality of light transmitting portions and a plurality of dimming portions; and a controller configured so as to control the light projecting unit, the display panel, and the barrier panel; and a reflective member, a traveling direction of at least part of image light emitted from the display panel being divided for a right eye and a left eye of a user, by the plurality of light transmitting portions and the plurality of dimming portions, the display panel being configured so as to include a first display region and a second display region which displays a planar image which is viewed by both eyes of the user, and to display a right-eye image which is viewed by the right eye of the user, in a right-eye visible region of the first display region, and a left-eye image which is viewed by the left eye of the user, in a left-eye visible region of the first display region, the barrier panel being configured so as to include a first barrier region corresponding to the first display region, configured so that the plurality of light transmitting portions and the plurality of dimming portions are formed in the first barrier region so that the right-eye visible region and the left-eye visible region are at different positions of the first display region, configured so as to further include a second barrier region corresponding to the second display region, and configured so that the plurality of light transmitting portions and the plurality of dimming portions are formed in the second barrier region in accordance with the planar image displayed in the second display region, the light projecting unit being configured so as to include a first light emitting region corresponding to the first display region and a second light emitting region corresponding to the second display region, the controller being configured so that, in a case where two consecutive frames are displayed, a portion located in the first display region is displayed as one parallax image frame including a first subframe and a second subframe, configured so as to control, for each parallax image frame, display of a parallax image in the first display region and formation of the plurality of light transmitting portions and the plurality of dimming portions in the first barrier region so that an image displayed in each of the first subframe and the second subframe included in the one parallax image frame is combined and viewed as one parallax image by the user, configured so that, in a case where the two consecutive frames are displayed, a portion located in the second display region is displayed as two planar image frames, configured so as to control, for each planar image frame, display of the planar image in the second display region and formation of the plurality of light transmitting portions and the plurality of dimming portions in the second barrier region, configured so that a frame rate of a subframe included in the parallax image frame and a frame rate of the planar image frame are a same, configured so that a light quantity of light emitted from the first light emitting region is reduced during a frame change period which includes a timing of changing display from the parallax image frame to a new parallax image frame, and configured so that a light quantity in the second light emitting region is reduced, but a light quantity in the first light emitting region is not reduced during a subframe change period which includes a timing of changing display from the first subframe to the second subframe in the first display region, the reflective member reflecting the image light and causing the image light to reach the left eye and the right eye of the user.

* * * * *